United States Patent [19]
Klebanoff

[11] 3,986,292
[45] Oct. 19, 1976

[54] INSECT KILLING DEVICE
[75] Inventor: Leonard Klebanoff, Agincourt, Canada
[73] Assignee: Harold Payne, Toronto, Canada
[22] Filed: May 5, 1975
[21] Appl. No.: 574,610

[52] U.S. Cl. ............................................. 43/112
[51] Int. Cl.² ........................................ A01M 1/22
[58] Field of Search ................................ 43/112

[56] References Cited
UNITED STATES PATENTS

| | | | |
|---|---|---|---|
| 1,962,420 | 6/1934 | Bradley | 43/112 |
| 2,061,458 | 11/1936 | Folmer et al. | 43/112 |
| 3,258,872 | 7/1966 | Senkewich | 43/112 X |

FOREIGN PATENTS OR APPLICATIONS
383,064  12/1964  Switzerland ........................ 43/112

Primary Examiner—Louis G. Mancene
Assistant Examiner—Daniel J. Leach
Attorney, Agent, or Firm—Fetherstonhaugh & Co.

[57] ABSTRACT

An electrical insect killer connectable to a source of domestic alternating current and having a condenser chargeable from the current source through a current pulse transformer. The condenser plates are connected to a grid, the conductive elements of which are spaced apart a distance to be short circuited by an insect. The insect is electrocuted by discharge of the condenser.

3 Claims, 3 Drawing Figures

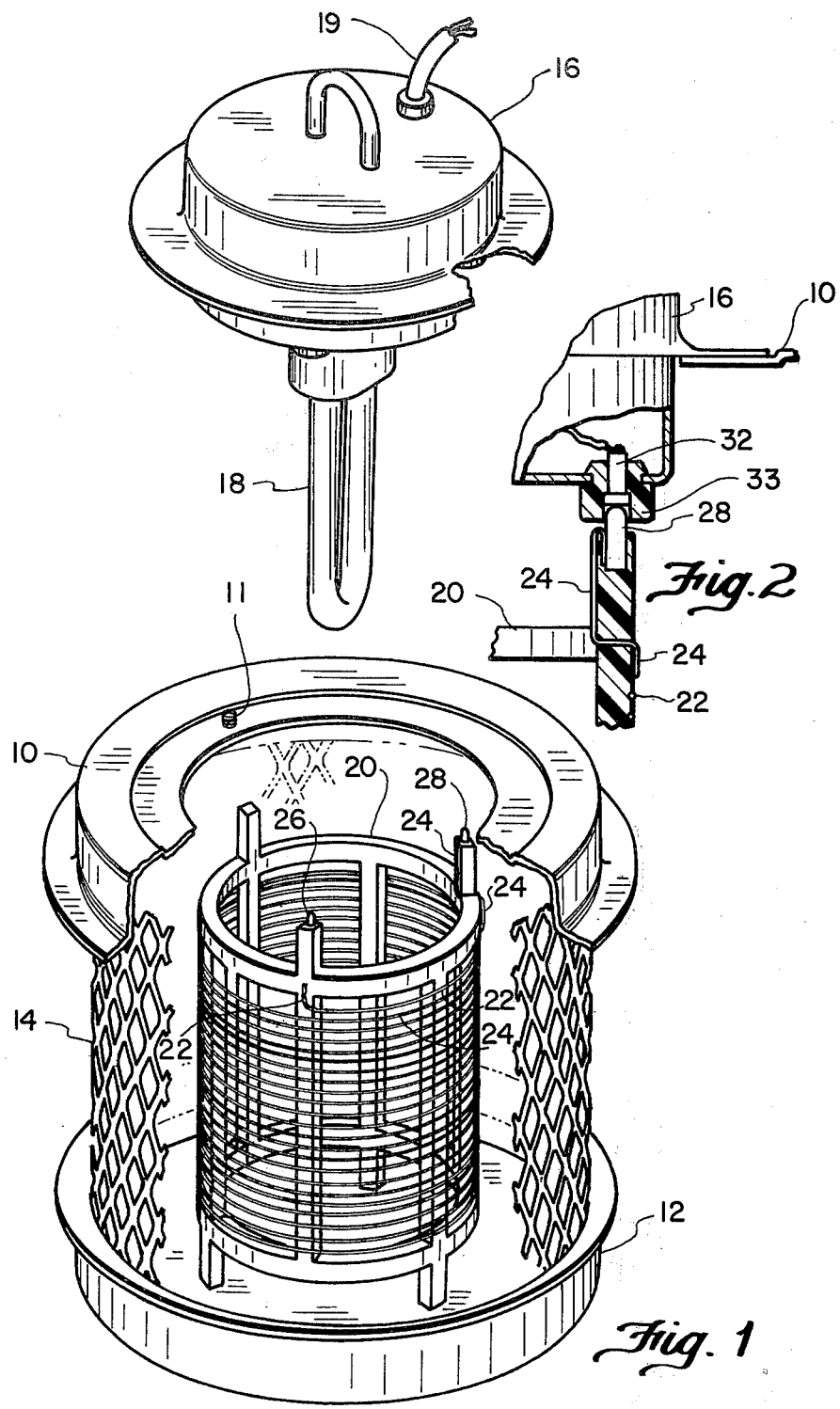

INSECT KILLING DEVICE

This invention relates to a device for killing insects by electrocution.

The devices for killing insects by electrocution are well known. They employ a bank of electrical condensers which are charged to a high voltage. The high voltage is applied to a grid that is engageable by insects to short circuit the condensers and kill the insects by electrocution. It is usual in devices of this kind to charge the condensers from a domestic alternating current supply through a high voltage transformer or through a series of capacitive voltage doubling circuits. The potential across the condensers is usually in the order of 4000 volts and, in order to achieve a condenser voltage of this magnitude using a transformer and/or a series of capacitive voltage doubling devices, one is involved with relatively expensive and cumbersome circuitry. A transformer suitable for transforming the standard 25 or 60 cycle electrical energy normally supplied for household use for the purposes of an insect killer is large in size, heavy in weight and relatively expensive. A series of capacitive voltage doubling devices sufficient to achieve the necessary voltage for the purposes of an insect killer is also bulky and relatively expensive.

This invention provides a less bulky and, thus, costly arrangement for charging the condensers of an insect killing device.

An insect killer according to the invention comprises a step-up transformer having a primary winding and a secondary winding, means connectible to a low frequency alternating voltage source for supplying non-alternating current pulses to the primary winding of said transformer at a high frequency of at least 2,000 cycles per second, capacitive storage means connected to a secondary winding of said transformer chargeable from the secondary winding of said transformer, an open circuit grid connected across capacitive storage means, said grid having two conductive elements in close proximity to each other and adapted to be short circuited by the incidence of an insect thereacross. The invention will be clearly understood after reference to the following description of an embodiment thereof.

In the drawings:

FIG. 1 is an exploded illustration of the principal mechanical parts of the insect killer;

FIG. 2 is a sectional detail illustrating the electrical connection between the voltage producing part of the circuit and the grid.

Figure 3:
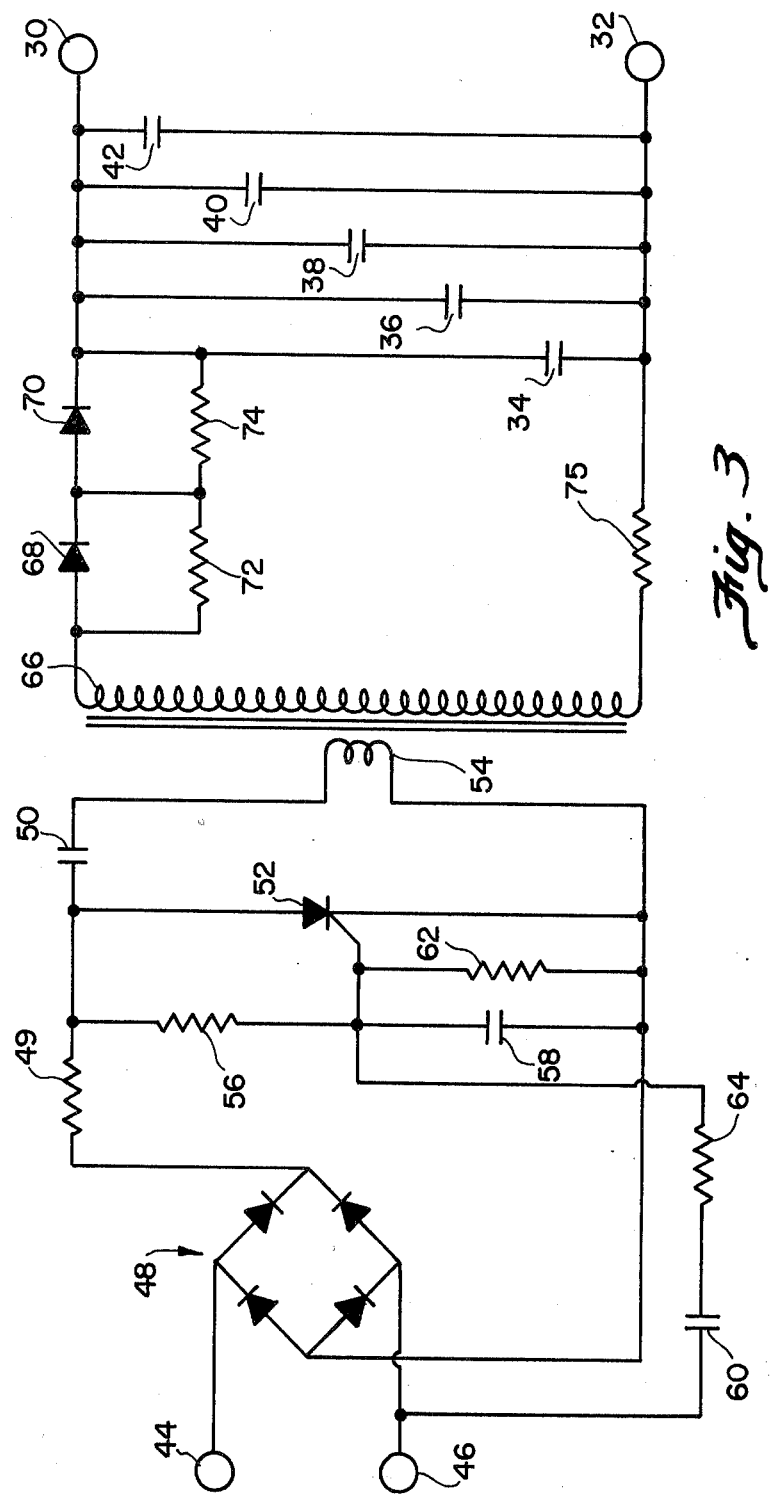
FIG. 3 is a circuit diagram of the insect killer.

The insect killer has a housing that consists of an upper rim 10, a lower tray 12 supported in spaced apart relation by a wire mesh protector screen 14. The voltage producing part of the electrical circuit of the device is housed within the container 16 from which an insect attracting lamp 18 depends. Numeral 19 is an electrical supply cord for connecting the device to a source of low frequency domestic electrical energy.

A grid structure, generally indicated by the numeral 20 is mounted rigidly on the tray 12 and consists of two wires 22 and 24 spirally wound on the insulating plastic frame as indicated with their turns alternating on the frame so that an insect stricking any two adjacent turns would short circuit the wires. Wire 22 electrically connects with connector post 26 and wire 24 electrically connects with connector post 28 and, in use, a high voltage is applied to the wires 22 and 24 through their respective posts 26 and 28 so that when an insect touches any two adjacent turns of the wires on the frame 20, it is electrocuted by the voltage that is applied to the wire terminals 26 and 28.

As indicated, the voltage producing part of the electrical circuit for the device is contained within the container 16 and it has output terminals 30 and 32 on the underside of the container that electrically connect with the posts 26 and 28 when the container is placed over the housing and secured thereto. In this connection, rim 10 of the housing has diametrically opposed threaded shanks 11 (only one of which is illustrated in FIG. 1) extending upwardly therefrom and the rim of the container 16 is formed with holes to permit the passage of shanks 11 therethrough as the container is placed over the rim of the housing so that the flange thereof engages the rim 10 as illustrated in FIG. 2. The threaded shanks 11 extend through the holes and nuts are applied to the upstanding threaded shanks to secure the container 16 in position over the top opening of the housing. In this position, the light 18 is container within the central space of the frame 20 to attract bugs to cross the wires of the grid system as will be explained later.

FIG. 2 is a detailed illustration showing the manner in which the contact 32 of the container engages with the contact 28 of the grid structure. Contact 28, it will be noted, electrically connects with wire 24. Contact 32 is mounted in an insulating plastic fitting 33 that is mounted on the metal frame of the container 16 and engages with pin 28 as the container is secured in place on the housing. It will be appreciated that the interconnection of output terminal 30 and connector 26 is of identical design.

Reference will now be made to the electrical circuit. Numerals 30 and 32, the output terminals of the circuit which engage the contacts 26 and 28 of the grid wires as the container 16 is located on the housing are indicated by similar numerals 30 and 32 on the circuit diagram of FIG. 3. Numerals 34, 36, 38, 40 and 42 are the individual condensers of a bank of condensers which, in use, are charged to about 4,000 volts from a standard domestic 110 volt 60 cycle alternating current supply through the input terminals indicated by numerals 44 and 46. The power supply wire 19 of FIG. 1 connects with the input terminals 44 and 46. It has been found that the bank of condensers can be charged with a voltage sufficiently high to kill insects and at a rate sufficient for insect killing purposes in use through a pulse transformer having a pulse frequency of about 3,000 cycles per second.

Numeral 48 generally refers to a full wave rectifier bridge which supplies a series of positive half wave voltage forms to the condenser 50 when the terminals 44 and 46 are connected to a low frequency alternating voltage. The continuous series of positive going half wave voltage forms at the output of the rectifier bridge 48 are referred to herein as non-alternating current pulses. They are referred to as non-alternating in the sense that the pulse is always positive in contrast to the wave form of voltage at terminals 44 and 46. The latter voltage alternates between positive and negative at each half cycle. Thus, the output of the rectifier bridge 48 is a non-alternating form.

Numeral 52 refers to a silicon controlled rectifier the gate of which is connected to condenser 50 through a bias resistor 56. It acts as a unidirectional current flow device. It is gate controlled in that it fires or conducts when a positive voltage of sufficient magnitude and duration is applied to its gate. It ceases to conduct when the voltage falls or its anode falls below a predetermined magnitude.

The rectifier 52 and its associated biasing circuitry which includes condenser 58, condenser 60, resistor 62 and resistor 64 operates in use to supply non-alternating current pulses to the primary winding 54 of the transformer having a frequency of about 3,000 cycles per second. Resistor 49 is a current limiting resistor. Essentially, as condenser 50 is charged from the output of the rectifier 48, the voltage on the gate of the rectifier 52 increases until the rectifier fires. After it fires and commences conducting, the voltage on its anode drops to below the value required to maintain the device conducting as condenser 50 discharges. When this occurs, current flow through the rectifier 52 ceases and voltage again builds up on the condenser 50. When it reaches a sufficient amount, the rectifier again fires. Thus, there are a series of pulse currents through the rectifier 52 and through the primary winding 54 of the transformer. As indicated, the characteristics of the device and its biasing are such that the pulse current through the primary winding 54 of the transformer is in the order of 3,000 cycles per second.

It will be noted that the secondary winding 66 of the transformer is of infinitely more turns than the primary winding 54 and there is a very substantial step up in voltage from the primary winding 54 to the secondary winding 66. A wave form of the current in the primary winding 54 is a series of positive pulses of varying peak value, the peaks being enveloped in form by the wave form of the full wave rectifier output from the bridge rectifier 48. With a 110 volt r.m.s. 60 cycle input to the terminals 44 and 46, the value of the highest pulse will be about 150 volts peak. The highest output voltage at the output terminal of the secondary winding 66 of the transformer for the peak voltage of about 150 volts at the input will be in the order of 6,000 volts. This results in a maximum voltage on the bank of condensers 34, 36, 38, 40 and 42 of about 4,000 volts having regard to impedance and other losses in the circuit.

The power from the pulsing output of the secondary winding 66 of the transformer is, as indicated above, stored on the condensers 34, 36, 38, 40 and 42 and is applied therethrough the diodes 68 and 70 and high value resistors 72 and 74. Diodes 68 and 70 are designed to stand about 3000 volts each and high value resistors 72 and 74 are used to ensure even voltage distribution across them. Resistor 75 is a load limiting resistor.

In use, the electrical circuit illustrated in FIG. 3 is housed within the container 16 and bolted to the body of the device to dispose the light 18 in the centre of the grid structure 20 as described above. The device is connected to a domestic alternating current power supply through electrical cord 19. Light 18 is through interconnection in the container 16 connected to the supply so that it is illuminated.

Insects are attracted to the light and fly through a protective screen 14 as they attempt to travel to it. They strike adjacent wires 22 and 24 of the grid structure and, thereby, short circuit the charged condensers 34, 36, 38, 40 and 42 through their body and become electrocuted. Upon electrocution they lose their energy and fall into the tray 12. It has been found that the circuit illustrated is quite capable of supplying sufficient power to the condensers 34, 36, 38, 40 and 42 at a rate that will kill insects as they are encountered in insect-infested areas. The device is especially useful on patios and the like.

In the embodiment of the invention illustrated, the following is the specification for the circuit components used:

| | |
|---|---|
| Diodes of Rectifier 48 | 1N4005 mfd by I.R.C. |
| Resistor 49 | 600 ohm, 10 watt |
| Condenser 50 | 0.22 micro farad, 200 volt |
| Resistor 56 | 82 kilo ohms, ½ watt |
| Condenser 58 | 0.1 micro farad, 200 volt |
| Condenser 60 | 0.047 micro farad 200 volt |
| Resistor 62 | 4.7 kilo ohm, ½ watt |
| Resistor 64 | 22 kilo ohm, ½ watt |
| Diode 68 | SSCM30 SKV 25 m A by Semtech |
| Diode 70 | SSCM30 SKV 25 m A by Semtech |
| Resistor 72 | 22 mega ohm, ½ watt |
| Resistor 74 | 22 mega ohm, ½ watt |
| Condensers 34, 36, 38, 40 and 42 | 0.008 mfd 4 KV disc ceramic |

Modifications in the circuit design will be apparent to those skilled in the art. The oscillating circuit for the silicon controlled rectifier is capable of considerable variation. The resistor and diode arrangement in the output side of the transformer which includes the storage condensers 34, 36, 38, 40 and 42 is also capable of variation and will depend upon, among other things, the particular type of storage condensers selected. The pulsing rate of the rectifier 52 is, as indicated, about 3000 cycles per second. This pulsing rate has been felt satisfactory with the circuit configuration illustrated and it is chosen to ensure a sufficient voltage on the bank of storage condensers and a reasonably rapid recovery time after they have been discharged in their function of killing an insect. It will be apparent that when the condensers discharge to kill an insect, they must quickly recover sufficient charge to kill a next following insect that strikes the grids. If the pulsing rate is decreased, the voltage on the storage condensers and the recovery time for satisfactory operation is also decreased. The upper limit of the pulsing rate is governed by a consideration of the charging time of the condenser 58 and the power dissipation characteristics of resistor 49 and silicon controlled rectifier 52. Thus, with an increased pulsing rate, one must supply more current to condenser 50 to charge it faster. As this occurs, more power is dissipated in resistor 49 and its power rating must be increased. There is a limit to the size of resistor that can be used at component 49 because the heat therefrom must be dissipated and, as the resistor is increased in capacity, its size increases to beyond what is convenient for closure in the container 16. Similarly, increased firing rate involves greater power and heat dissipation in the rectifier 52. Thus, while from a voltage and charging time point of view it is desirable to have the pulsing rate high, there are upper limits dictated by practical consideration of component performance. At the same time, in order to achieve satisfactory operation with a circuit of this nature, one does require a minimum pulse rate of about 2,000 pulses per second. Pulse rates above this are satisfactory subject to practical circuit limitations.

The gate voltage of silicon rectifier 52 that permits firing must also be selected. If it fires when the voltage on the condenser 50 is too low, the current pulse supplied to the transformer will be insufficient. If, on the other hand, firing is delayed too long, the pulsing rate will be too low to produce the required output voltage and recovery time necessary for a satisfactory device on this type.

A full wave rectifier has been illustrated but it is conceivable that a half wave rectifier could supply the necessary power.

Selection of the circuit components and circuit design in any particular case is a matter of skill in the art.

The embodiments of the invention in which an exclusive property or privilege is claimed are defined as follows.

1. An insect killer comprising
a step-up transformer having a primary winding and a secondary winding,
means connectible to a low frequency alternating voltage source for supplying non-alternating current pulses to the primary winding of said transformer at a high frequency of at least 2,000 cycles per second,
capacitive storage means connected to the secondary winding of said transformer chargeable from the secondary winding of said transformer.
an open circuit grid connected across said capacitive storage means,
said grid having two conductive elements in close proximity to each other and adapted to be short circuited by the incidence of an insect thereacross.

2. An insect killer as claimed in claim 1 in which said means connectible to an alternating voltage source for supplying non-alternating pulses comprises
a full wave rectifier,
capacitive means having one side thereof connected to one side of the primary winding of said transformer and the other side thereof connected through a unidirectional flow current device to the other side of the primary winding of said transformer,
means for biasing said unidirectional current flow device to conduct in pulses of at least 2,000 cycles per second whereby to supply non-alternating voltage pulses to the primary winding of said transformer of at least 2,000 cycles per second.

3. An insect killer as claimed in claim 1 in which said non-alternating pulses to the primary of said transformer are about 3,000 cycles per second.

* * * * *